United States Patent [19]

Sasaki

[11] Patent Number: 5,224,398
[45] Date of Patent: Jul. 6, 1993

[54] AUTOMATIC TRANSMISSION CONTROL SYSTEM

[75] Inventor: Kazuo Sasaki, Hiroshima, Japan

[73] Assignee: Mazda Motor Corporation, Hiroshima, Japan

[21] Appl. No.: 766,183

[22] Filed: Sep. 27, 1991

[30] Foreign Application Priority Data

Sep. 28, 1990 [JP] Japan ................................ 2-261079

[51] Int. Cl.$^5$ .............................................. F16H 61/00
[52] U.S. Cl. ...................................... 74/844; 74/866; 364/424.1
[58] Field of Search ................ 74/844, 866; 364/424.1

[56] References Cited

U.S. PATENT DOCUMENTS

| | | | |
|---|---|---|---|
| 4,222,292 | 9/1980 | Will et al. ............................ | 74/866 |
| 4,346,626 | 8/1982 | Kawamoto ........................... | 74/866 |
| 4,665,777 | 5/1987 | Kikuchi et al. ...................... | 74/866 |
| 4,694,709 | 9/1987 | Kikuchi et al. ...................... | 74/866 |
| 4,829,852 | 5/1989 | Sakakiyama ......................... | 74/866 |
| 4,881,178 | 11/1989 | Kato et al. .................... | 364/424.1 X |
| 4,984,485 | 1/1991 | Kojima et al. ............... | 364/424.1 X |
| 5,094,128 | 3/1992 | Kamada ............................... | 74/866 |

FOREIGN PATENT DOCUMENTS 61-65949 4/1986 Japan .

Primary Examiner—Richard M. Lorence
Assistant Examiner—Khoi Q. Ta
Attorney, Agent, or Firm—Keck, Mahin & Cate

[57] ABSTRACT

A control system controls an automatic transmission so that it holds a higher gear for a certain period and then shifts into a specific lower gear suitable for starting a vehicle when the automatic transmission is changed into a forward drive range from a non-forward drive range. When an on-shift input speed, detected at a shift of the automatic transmission into a forward drive range, is higher than a predetermined critical speed (TR1), the control system forces the automatic transmission to hold the high gear as long as the transmission input speed increases while the automatic transmission is in the forward range. The control system further forcibly shifts the automatic transmission into the specific gear when an input speed is higher than a predetermined limit speed.

5 Claims, 4 Drawing Sheets

AUTOMATIC TRANSMISSION CONTROL SYSTEM

The present invention relates to a control system for an automatic transmission of an automotive vehicle. More particularly, the invention relates to an automatic transmission control system which can reduce shift shocks on starting of the automotive vehicle.

BACKGROUND OF THE INVENTION

1. Field of the Invention

For effectively reducing shift shocks caused when starting an automotive vehicle, it is known to automatically shift an automatic transmission to a third speed gear after it has been changed to a forward drive range from a neutral range so as to start the vehicle moving. The automatic transmission is then shifted to a first speed gear after the speed of rotation of a turbine of the torque convertor drops and reaches a critical speed of rotation, which has been predetermined. Such an automatic transmission is known from, for instance, Japanese Unexamined Patent Publication No. 61-65,949.

2. Description of Related Art

An automatic transmission of this type tends to be shifted to the first speed gear, without passing the third speed gear, when it is shifted to the forward drive range from a reverse range while passing through the neutral range on starting of the car. This is because the torque convertor holds the speed of rotation of the turbine (which is referred to as the turbine speed, for simplicity) at zero (0) while the automatic transmission is manually changed into the reverse range from a park range. Although an increase in turbine speed is caused while the automatic transmission is in the neutral range, the turbine speed is still lower than the critical speed when the automatic transmission is manually changed into a forward drive range. Accordingly, the automatic transmission may accidentally be shifted directly into the first speed gear without temporarily shifting into the third speed gear. Some drivers prefer to shift the automatic transmission to the neutral range at certain times, such as immediately after the car is brought to a stop at a traffic light. A shift to a forward drive range then is made when the car is to move again. When repeatedly changing into the forward drive range in a short period of time, the known automatic transmission referred to above may be automatically shifted into the third speed gear before it shifts into the first speed gear, suitable for acceleration, whenever the vehicle is started. This leads to adverse effects on the starting performance of the vehicle.

SUMMARY OF THE INVENTION

It is, therefore, a primary object of the present invention to provide an automatic transmission control system which can reduce shift shocks in the automatic transmission when the automatic transmission is changed into a forward drive range to start a vehicle moving.

This object is achieved by providing a control system which controls an automatic transmission so as to hold it in a high gear, such as a third gear, for a predetermined period of time. Then, the transmission is shifted into a specific gear, such as a first gear, lower than the high gear which is suitable for initiating movement of the vehicle. Both of these operations occur when the automatic transmission is changed into a forward drive range from a non-forward drive range. The control system further controls the automatic transmission so that when an on-shift input speed (TRVE1), detected when the automatic transmission shifts into a forward drive range, is higher than a predetermined critical speed (TR1), the automatic transmission is forced to hold the high gear as long as the input speed of the automatic transmission increases while the automatic transmission is in the forward range. The control system further forces the automatic transmission to shift into the specific gear when an input speed is higher than a predetermined upper limit speed (TR5) higher than the predetermined critical speed (TR1).

According to a specific embodiment of the present invention, the control system further forces the automatic transmission not to perform the control of shifting, after holding the high gear for a predetermined period of time, into a specific gear when another change of the automatic transmission into a neutral range from the forward drive range, during starting of the vehicle, occurs. That is, the control system forces the automatic transmission to shift into the specific gear when an input speed is lower than a predetermined lower limit speed (TR6) which, in turn, is lower than the predetermined critical speed (TR1).

BRIEF DESCRIPTION OF THE DRAWINGS

The above and other objects and features will be apparent to those skilled in the art from the following description of a preferred embodiment thereof when considered in conjunction with the accompanying drawings, in which:

FIGS. 2, 2a and 2b are a flow chart illustrating a control routine for performing a gear shift of the automatic transmission at a start of a vehicle.

DETAILED DESCRIPTION OF THE PREFERRED

Figure 1:
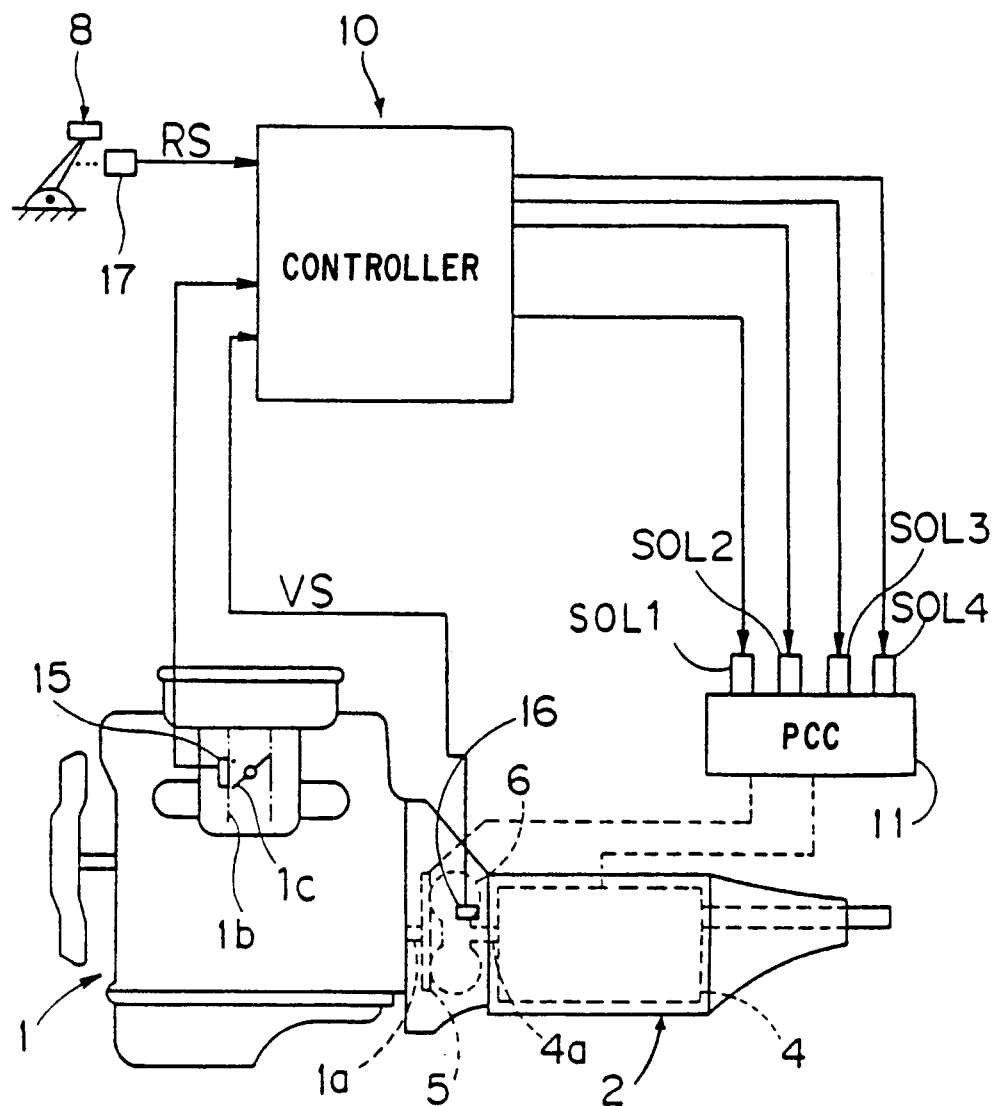
FIG. 1 is a schematic illustration of an automatic transmission for an automobile engine which is controlled by a transmission control system in accordance with a preferred embodiment of the present invention.

Referring to the drawings in detail and, in particular, to FIG. 1, an automatic transmission 2 with an electronic control system in accordance with a preferred embodiment of the present invention is shown. The transmission comprises a multi-speed transmission 4 including a transmission input shaft 4a and has, for example, four forward gears or speeds and one reverse gear or speed, and a hydraulic torque convertor 6 equipped with a lockup clutch 5. The torque convertor 6 typically comprises a pump fastened to an engine output shaft 1a of an engine 1 and a turbine fastened to the transmission input shaft 4a. Because both the pump and turbine are well known in the art, they are neither described here nor shown in FIG. 1. When the lockup clutch 5 is activated, the pump and turbine of the torque convertor are mechanically locked together.

The automatic transmission 2 is manually changed by a shift lever 8 to an desired forward drive range, such as a drive range (D), in which first to fourth speed gears are automatically selected, a second range (S), in which first to third speed gears are automatically selected, a low range (L), in which first to second speed gears are automatically selected, a neutral range (N), a reverse range (R) and a park range (P).

The control system includes a control unit 10, mainly comprising a microcomputer, for controlling solenoid valves SOL1 to SOL4 of a hydraulic pressure control circuit (PCC) 11, which itself is well known in the art, having internal timers.

The control unit 10 receives signals from a throttle opening sensor 15, a turbine speed sensor 16 and a shift range sensor 17. The throttle opening sensor 15 detects an opening of a throttle valve 1c for opening and closing an intake passage 1b of the engine 1. The turbine speed sensor 16 detects a turbine speed of the turbine of the torque convertor 6 and determines it to be the speed of the transmission input shaft 4a of the automatic transmission 2. The shift range sensor 17 detects a position to which the shift lever 8 is moved to select a desired range.

Figure 2A:
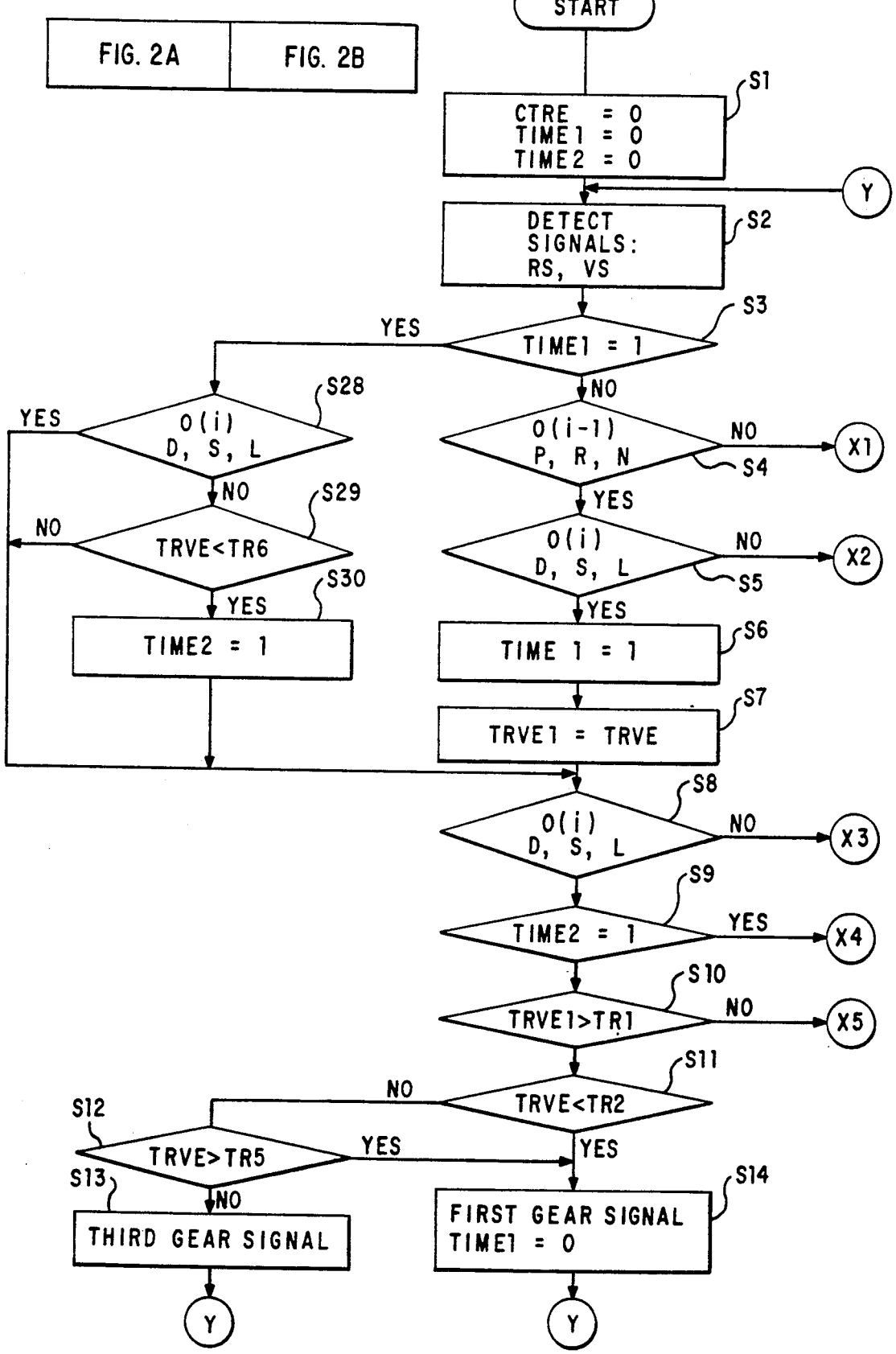
Figure 2B:
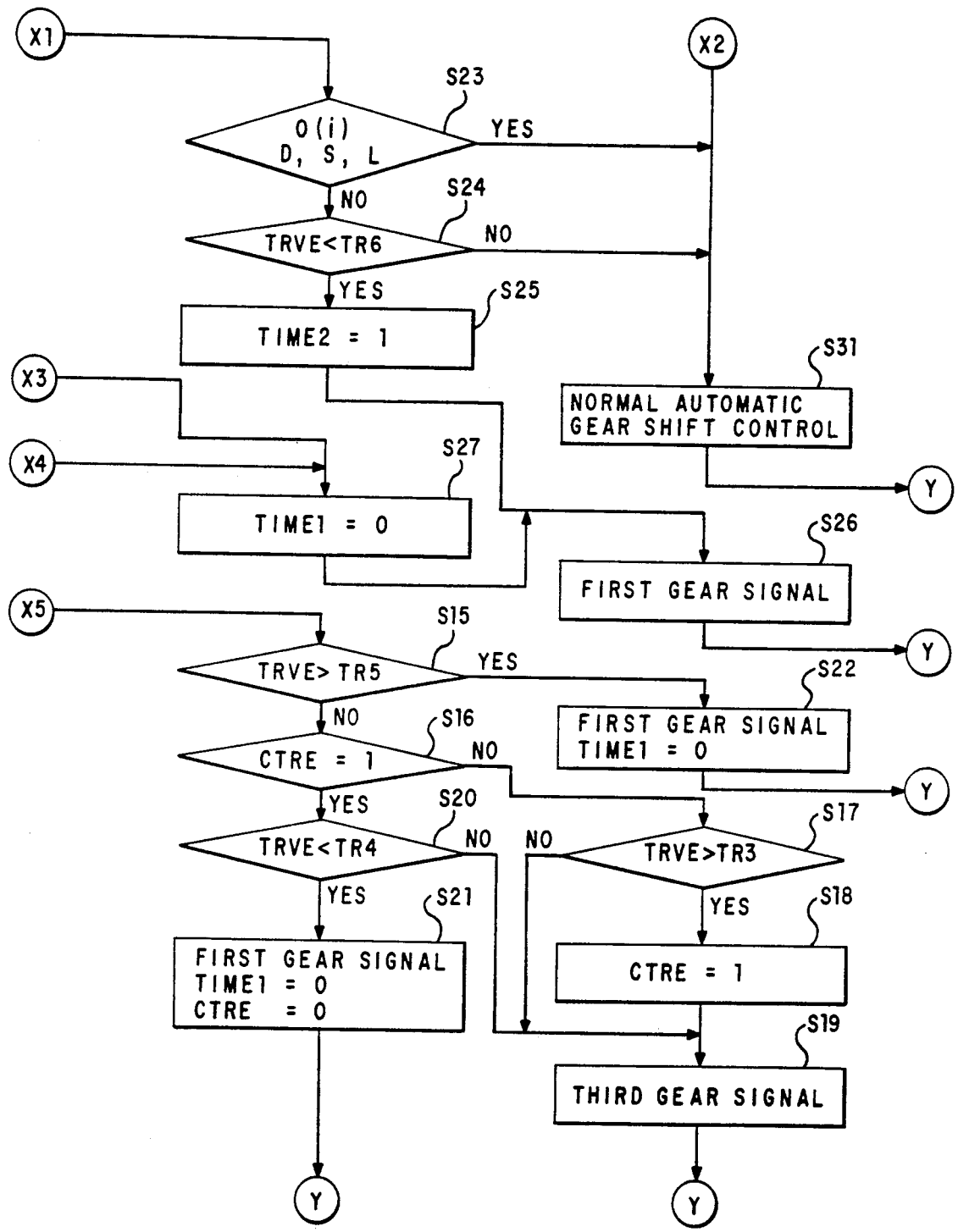

The operation of the automatic transmission 2 described in FIG. 1 is best understood by reviewing FIG. 2, which is a flow chart illustrating a control routine, for performing a gear shift of the automatic transmission 2 at the start of vehicle movement, for the microcomputer of the control unit. Programming a computer is a skill well understood in the art. The following description is written to enable a programmer having ordinary skill in the art to prepare an appropriate program for the microcomputer. The particular details of any such program would, of course, depend upon the architecture of the particular computer selected.

Figure 3A:
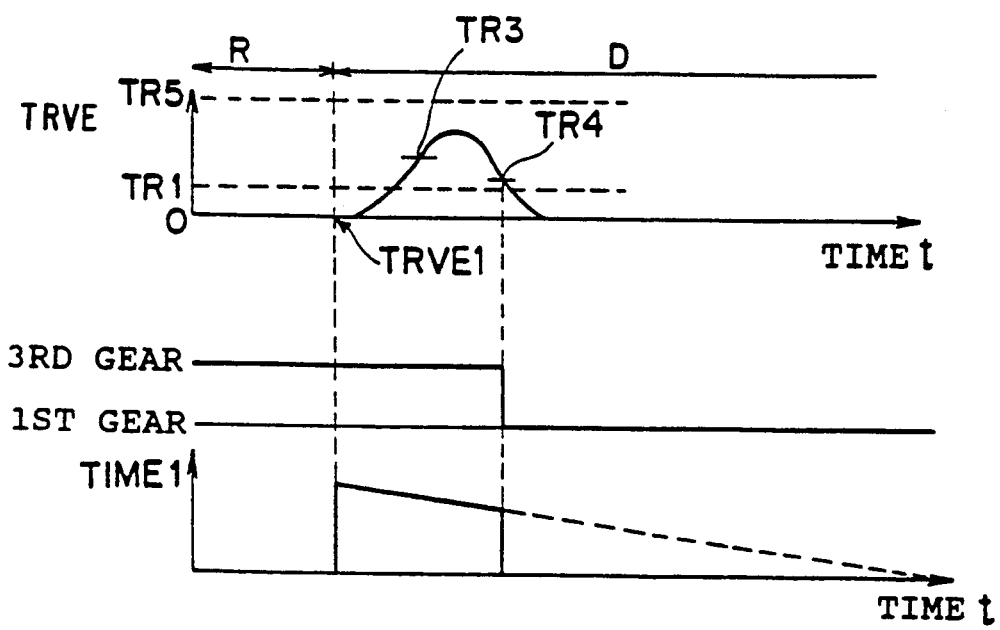
FIGS. 3A and 3B are time charts showing a speed change of the automatic transmission.
Figure 3B:
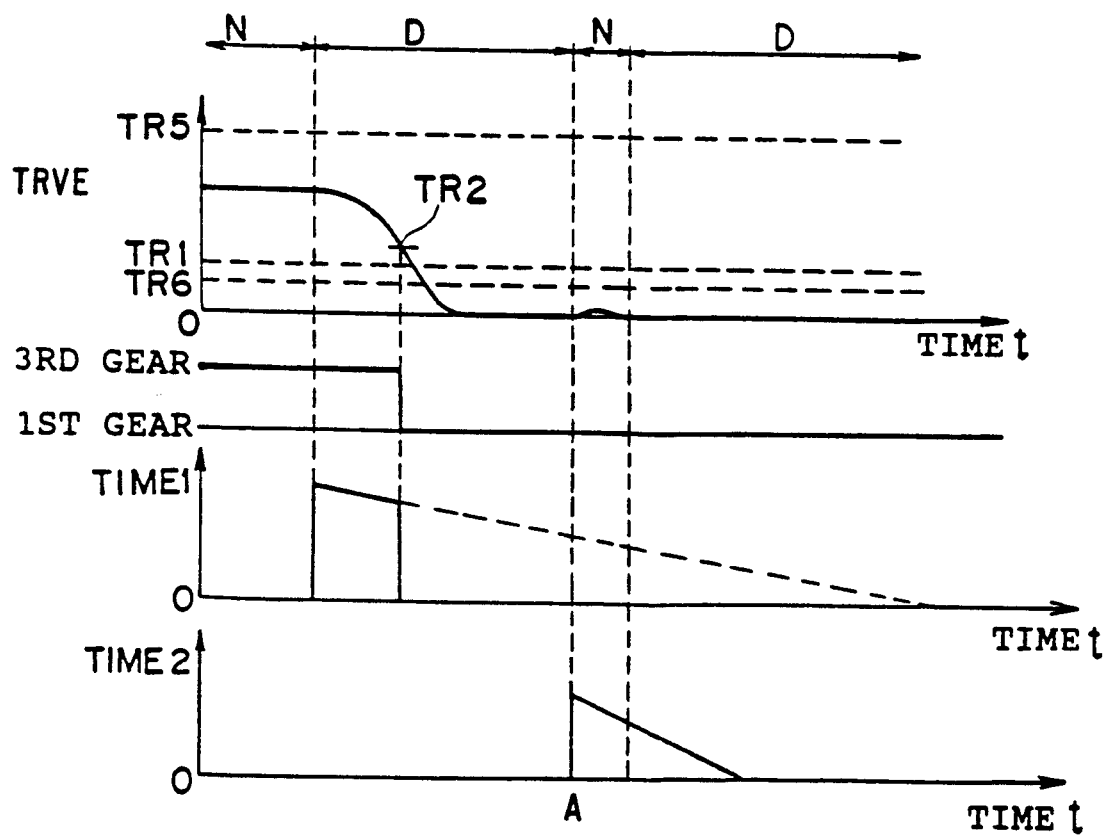

After resetting a flag CTRE and first and second timer values TIME1 and TIME2 to their initial state and values, respectively, of "0" at step S1, signals RS and VS are read from the shift range sensor 17 and the turbine speed sensor 16 at step S2 to determine the range of the automatic transmission 2 selected by the shift lever 8 and the turbine speed TRVE of the torque convertor 6 as an input speed of the automatic transmission 2. It is to be noted that when an internal timer is set to a timer value of "1", a control which is currently being performed is maintained for a period of time defined by the timer value of "1". Thereafter, a decision is made at step S3 as to whether the first timer value TIME1 is "1." Since the first timer value TIME1 has been set to its initial value "0," the answer to the decision is no. Then, decisions are made at steps S4 and S5 regarding selected ranges. That is, a decision is made at step S4 if any one of the non-forward drive ranges, such as a park range (P), a reverse range (R) and a neutral range (N), has been manually selected in the last operation 0(i−1). If any one of the park range (P), the reverse range (R) and the neutral range (N) has been selected in the last operation, a decision is further made at step S5 if any one of the forward drive ranges, such as a drive range (D), wherein first to fourth gears are automatically selected, a second range (S), wherein the first to third gears are automatically selected, and a first or low range (L), wherein the first and second gears are selected, has been manually selected in the current operation 0(i). These automatic gear selections are performed according to a predetermined shift schedule well known in the art. If the answers to both of the decisions are yes, this indicates that the automatic transmission 2 has manually been changed from a non-forward drive range to a forward drive range so as to start the vehicle moving. Then, after setting the first timer value TIME1 to "1" at step S6 and storing the turbine speed TRVE at the time the automatic transmission is changed into the forward drive range at step S7 as an on-shift input speed TRVE1, the same decision regarding the forward drive range as was made at step S5 is made at step S8. If the automatic transmission 2 is actually in any one of the forward drive ranges, a decision is made at step S9 as to whether the second timer value TIME2 is "1." Since the second timer value TIME2 has been set to "0" at step S1 for initialization, a decision is made at step S10 as to whether the on-shift turbine speed TRVE1 is higher than a critical speed TR1 shown in FIG. 3A. The critical speed TR1 is predetermined to determine a change of the automatic transmission 2 into a forward drive range. That is, the automatic transmission 2 is determined to have changed into a forward drive range from the neutral range when the on-shift turbine speed TRVE1 is higher than the critical speed TR1 and from the park range or the reverse range when the on-shift turbine speed TRVE1 is almost equal to or lower than the critical speed TR1. A yes answer to the decision made at step S10 indicates that the automatic transmission 2 is in a transitional state from the neutral range (N) to a forward drive range, for example the drive range (D) as shown in FIG. 3B. On the other hand, a no answer to the decision made at step S10 indicates that the automatic transmission 2 is in a transitional state from, for example, the reverse range (R) to the drive range (D), as shown in FIG. 3A.

If the answer to the decision at step S1 is yes, a decision is made at step S11 as to whether the current turbine speed TRVE is lower than a critical turbine speed TR2, which is higher than the predetermined critical turbine speed TR1 and is suitably predetermined for the automatic transmission to shift into the first gear. If the current turbine speed TRVE is higher than the critical turbine speed TR2, a further decision is made at step S12 as to whether the current turbine speed TRVE is higher than a higher limit turbine speed TR5. The higher or upper limit turbine speed TR5 is predetermined to be sufficient to force the automatic transmission 2 to shift into the first gear. Except when the current turbine speed TRVE is higher than the predetermined higher limit turbine speed TR5, the control unit 10 provides, at step S13, a third gear shift signal which selectively energizes and de-energizes the solenoid valves SOL1 to SOL4 of the hydraulic pressure control circuit 11 to place the automatic transmission 2 into the third gear. Then, the final step orders return to step S2. After the automatic transmission 2 has shifted to the third gear, the turbine speed drops.

Because the timer value TIME1 has been set at step S6, the answer to the decision at step S3 will become yes. Then, a decision is made at step S28 as to whether the automatic transmission 2 is still in one of the forward drive ranges. As long as the range of the automatic transmission 2 has changed, the answer to this decision is yes, and the transmission control is performed through steps S8–S13.

As a result of a shift of the automatic transmission 2 to the third gear, the turbine speed TRVE gradually drops down. When the current turbine speed TRVE reaches a speed lower than the critical turbine speed TR2, the answer to the decision made at step S11 becomes yes. Then, the control unit 10 provides, at step S14, a first gear shift signal which selectively energizes and de-energizes the solenoid valves SOL1 to SOL4 of the hydraulic pressure control circuit 11, places the automatic transmission 2 into the first gear, and resets the first timer value TIME1 to its initial value "0." After the automatic transmission 2 has shifted to the first gear, the final step orders return to step S2

If, in fact, the answer to the decision made at step S10 is no this indicates that the automatic transmission 2 is in transition from the reverse range (R) to the drive range (D) as shown in FIG. 3A. Then a decision is made at step S15 as to whether the current turbine speed TRVE is higher than the predetermined higher limit turbine speed TR5. If the current turbine speed TRVE is lower than the higher limit turbine speed TR5, another decision is made at step S16 as to whether the flag CTRE has been set to "1." Since the flag CTRE is initially reset to the initial state of "0," the answer to this decision is no. Then, a further decision is made at step S17 as to whether the current turbine speed TRVE is higher than a higher reference speed TR3, which is predetermined to be higher than the predetermined critical turbine speed TR1. When the current turbine speed TRVE is equal to or lower than the higher reference speed TR3, it is decided that the current turbine speed TRVE is still increasing. If the answer to this decision is no, this indicates that the turbine speed is increasing. Then, the control unit 10 provides, at step S19, a third gear shift signal which selectively energizes and de-energizes the solenoid valves SOL1 to SOL4 of the hydraulic pressure control circuit 11 to place the automatic transmission 2 into the third gear. After the automatic transmission 2 has shifted to the third gear, the final step orders return to step S2. As a result of the shift of the automatic transmission 2 to the third gear, the turbine speed TRVE drops down. When the current turbine speed TRVE reaches the higher reference speed TR3, the answer to the decision made at step S17 becomes yes. Then, after setting the flag CTRE to the state "1", indicating that the turbine speed has not yet dropped, the control unit 10 provides, at step S19, a third gear shift signal so as to keep the automatic transmission 2 in the third speed gear.

After setting the flag CTRE to "1," the answer to the decision at step S16 becomes yes. Then, a decision is made at step S20 as to whether the current turbine speed TRVE is lower than a lower reference speed TR4, which is predetermined to be lower than the higher reference speed TR3 but higher than the critical turbine speed TR1. When the current turbine speed TRVE is equal to or higher than the lower reference speed TR4, it is decided that the current turbine speed TRVE is not dropping. If the current turbine speed TRVE is equal to or higher than the lower reference speed TR4, namely, the answer to the decision at step S20 is no, then the control unit 10 provides, at step S19, a third gear shift signal so as to keep the automatic transmission 2 in the third gear. However, if the current turbine speed TRVE drops lower than the lower reference speed TR4, the answer to the decision at step S20 becomes yes. Then, the control unit 10 provides, at step S21, a first gear shift signal so as to shift the automatic transmission into the first gear and, simultaneously, resets the first timer value TIME1 and the flag CTRE to the initial value "0" and the initial state "0," respectively, and orders return to step S2.

When the turbine speed TRVE is higher than the upper limit turbine speed TR5 and the answer to the decision at step S15 is yes, the control unit 10 immediately provides, at step S22, a first gear shift signal so as to shift the automatic transmission into the first gear and, simultaneously, to reset the first timer value TIME1 to the initial value "0," and orders return to step S2.

Another shift operation of the automatic transmission to the neutral range (N) from the drive range (D) after a shift operation from the neutral rang (N) to the drive range (D) will now be described. After having been shifted into the first gear through the third gear as a result of the manual change of the automatic transmission 2 from the neutral range (N) to the drive range (D) in the last manual operation, when the automatic transmission is manually changed into the neutral range (N) from the drive range (D) at a time A, as shown in FIG. 3B, the answers to the decisions at steps S4 and S23 regarding the range selected for the last and current operations become no. Then, a decision is made at step S24 as to whether the current turbine speed TRVE is lower than a lower limit turbine speed TR6. If the answer to this decision is yes, after setting the second timer value TIME2 to "1" at step S25, the control unit 10 provides, at step S26, a first gear shift signal so as to keep the automatic transmission 2 in the first speed gear.

When, thereafter, the automatic transmission is manually changed into the drive range (D), the answers to the decisions made at steps S4 and S5 regarding the range selected for the last and current cycles become yes. In this sequence, although the first timer value TIME1 is set to "1" at step S6, since the second timer value TIME2 has been set to "1" and the answer to the decision at step S9 is yes, the first timer value TIME1 is reset to the initial value "0" at step S27. Thereafter, at step S26, the control unit 10 provides a first gear shift signal so as to keep the automatic transmission 2 in the first speed gear. When a manual change of the automatic transmission into the neutral range (N) from the drive range (D) is caused while the automatic transmission 2 is in the third gear during the manual shift from the neutral range (N) to the drive range (D) and the first timer value TIME1 is set to "1," the decisions at steps S28 and S29 are made. That is, a decision is made at step S28 as to whether the currently selected range is one of the forward drive ranges, such as the drive range (D), the second range (S) and the first or low range (L). If the answer to this decision is no, then, a decision is made at step S29 as to whether the current turbine speed TRVE is lower than the lower limit turbine speed TR6. If the answer to this decision is yes, the second timer value TIME2 is set to "1" at step S30. Thereafter, the automatic transmission 2 is held in the first gear through steps S27 and S26 before changing the drive range (D) or through steps S9, S27 and S26 after changing the drive range (D).

When changing the automatic transmission 2 into any one of the forward drive ranges, namely, the drive range (D), the second range (S) and the first or low range (L), the answers to the decisions at step S4 and S23 are no and yes, respectively. Then, an ordinary automatic shift control is caused, according to the predetermined shift schedule, at step S31.

As is apparent from the above description, the control system, when a manual change of the automatic transmission into one of the forward drive ranges (D), (S) and (L) occurs, changes a gear shift control to the first gear (starting speed gear) through the third gear (high speed gear) in two ways, according to current turbine speeds, taken as a transmission input speed. Specifically, steps S11–S14 are performed when the current turbine speed TRVE is higher than the specific speed TR1, and steps S15–S14 are performed when the current turbine speed TRVE is equal to or lower than the critical turbine speed TR1.

During starting of the vehicle, namely, when manually changing the automatic transmission into any one of the forward drive ranges (D), (S) and (L) from the neutral range (N), the control system controls the automatic transmission 2 through steps S11-S14 in the starting stage so that the transmission shifts into the first gear (starting gear) after holding the third speed gear (high speed gear) for a period during which the current turbine speed TRVE becomes lower than the critical speed TR2.

After repeatedly changing the automatic transmission into the forward drive ranges (D), (S) and (L), when the current turbine speed TRVE is decreased lower than the lower limit turbine speed TR6 as the friction coupling elements of the automatic transmission 2 become tightly coupled, the control system further inhibits the control in the starting stage so that the automatic transmission 2 holds the third speed gear (high speed gear) for a period during which the current turbine speed TRVE becomes lower than the critical turbine speed TR2 or holds the automatic transmission 2 in the first gear as steps S4 and S23-S30 are performed.

As is clear from FIG. 3B, when the automatic transmission 2, having the control system in accordance the above embodiment of the present invention, is changed into the drive range (D) from the neutral range (N) for starting the vehicle, it is subjected to lower shift shocks, owing to the automatic shift first to the third speed gear and then to the first speed gear when the current turbine speed TRVE has dropped down lower than the critical speed TR2.

On the other hand, as is clear from FIG. 3B, when the automatic transmission 2, having the control system in accordance the above embodiment of the present invention, is changed into the drive range (D) from the park range (P) for starting the vehicle, a different shift control is performed than when it is changed into the drive range (D) from the neutral range (N), because the initial turbine speed is zero (0). That is, the automatic transmission 2 is first forced to shift into the third speed gear, and then the control unit monitors an increase in turbine speed to determine the down-shifting at a time when the turbine speed TRVE becomes higher than the higher reference speed TR3. The transmission is, therefore, allowed to shift into the first speed gear when the turbine speed drops below the lower reference speed TR4. In such a way, the automatic transmission 2 shifts certainly into the first gear after shifting into the third gear, so that the automatic transmission is subjected to lower shift shocks both when changed into the drive range (D) from the park range (P) for starting the vehicle and when changed into the drive range (D) from the neutral range (N).

Furthermore, when the automatic transmission is repeatedly changed into the drive range (D) from the neutral range (N) for starting the vehicle up, it is not subjected to any shift shock in the following range change as long as it is shifted into the first gear through the third gear in the previous range change. This is because the automatic transmission 2 is forced, in the following range change, to shift into and to hold the first gear within the time set by the second timer TIME2, while the turbine speed is lower the lower limit speed TR6. Accordingly, when the automatic transmission 2 is repeatedly changed into the drive range (D) from the neutral range (N) within the time set by the second timer TIME2, the automatic transmission 2 holds the first gear so as to allow the vehicle to start easily and smoothly.

It is to be understood that although the present invention has been described in detail with respect to a preferred embodiment thereof, various other embodiments and variants which fall within the scope and spirit of the invention may occur to those skilled in the art. Such other embodiments and variants are intended to be covered by the following claims.

What is claimed is:

1. A control system for controlling an automatic transmission, after holding the automatic transmission in a high gear for a predetermined period of time, to shift itself into a specific gear, lower than the high gear, suitable for starting a vehicle when the automatic transmission is changed into a forward drive range from a non-forward drive range, said control system comprising:

a range sensor for detecting a position into which a shift lever for the automatic transmission is manually placed;

a speed sensor for detecting an input speed of the automatic transmission; and control means for (a) determining if a forward drive range of the automatic transmission has been selected, based on a signal from said range sensor, (b) placing the automatic transmission into the high gear when said input speed of the automatic transmission detected by said speed sensor is not less than a predetermined critical turbine speed at which the automatic transmission shifts into said specific gear and is not greater than an upper limit turbine speed and (c) holding the automatic transmission in the high gear when said input speed detected by said speed sensor is not less than a lower reference speed, if it is determined that a forward drive range of the automatic transmission has been selected.

2. A control system as defined in claim 1, wherein said control means forces the automatic transmission to shift into said specific gear when said speed sensor detects an input speed higher than a predetermined upper limit speed higher than said predetermined critical speed.

3. A control system as defined claim 1, wherein said control system forces the automatic transmission to shift into the specific gear when an input speed is lower than a predetermined lower limit speed, lower than said predetermined critical speed.

4. A control system as defined in claim 1, wherein said specific gear is a first gear.

5. A control system as defined in claim 1, wherein said high gear is a third gear.

* * * * *